United States Patent
Jensen et al.

(10) Patent No.: US 9,980,055 B2
(45) Date of Patent: May 22, 2018

(54) HEARING DEVICE AND A HEARING SYSTEM CONFIGURED TO LOCALIZE A SOUND SOURCE

(71) Applicant: Oticon A/S, Smørum (DK)

(72) Inventors: Jesper Jensen, Smørum (DK); Mojtaba Farmani, Smørum (DK); Michael Syskind Pedersen, Smørum (DK)

(73) Assignee: OTICON A/S, Smørum (DK)

( * ) Notice: Subject to any disclaimer, the term of this patent is extended or adjusted under 35 U.S.C. 154(b) by 0 days. days.

(21) Appl. No.: 15/290,643

(22) Filed: Oct. 11, 2016

(65) Prior Publication Data

US 2017/0105074 A1    Apr. 13, 2017

(30) Foreign Application Priority Data

Oct. 12, 2015  (EP) ..................................... 15189339

(51) Int. Cl.
*H04R 5/00*     (2006.01)
*H04R 25/00*    (2006.01)

(52) U.S. Cl.
CPC ......... *H04R 25/407* (2013.01); *H04R 25/405* (2013.01); *H04R 25/552* (2013.01)

(58) Field of Classification Search
CPC ... H04R 25/405; H04R 25/407; H04R 25/552
USPC ......... 381/23.1, 60, 312, 313, 356, 380, 381
See application file for complete search history.

(56) References Cited

U.S. PATENT DOCUMENTS

| 5,176,620 A | 1/1993 | Gilman |
| 9,699,583 B1* | 7/2017 | Lyren ..................... H04S 7/303 |
| 2009/0254338 A1* | 10/2009 | Chan .................. G10L 21/0272 704/205 |
| 2011/0038489 A1* | 2/2011 | Visser ................... G01S 3/8006 381/92 |
| 2014/0348331 A1* | 11/2014 | Gran .................... H04R 25/552 381/23.1 |
| 2015/0156578 A1* | 6/2015 | Alexandridis ......... H04R 3/005 381/92 |

(Continued)

OTHER PUBLICATIONS

WO2016/116160, Courtois,p. 1-32.*

(Continued)

*Primary Examiner* — William A Jerez Lora
(74) *Attorney, Agent, or Firm* — Birch, Stewart, Kolasch & Birch, LLP

(57) ABSTRACT

The problem of estimating the direction to one or more sound sources of interest relative to a user wearing a pair of hearing devices, e.g. hearing aids, is dealt with. A target signal is generated by a target signal source and transmitted through an acoustic channel to a microphone of a hearing system. Due to additive environmental noise, a noisy acoustic signal is received at the microphones of the hearing system. An essentially noise-free version of the target signal is transmitted to the hearing devices of the hearing system via a wireless connection. Each of the hearing devices comprises a signal processing unit comprising a sound propagation model of the acoustic propagation channel from the target sound source to the hearing device when worn by the user. The sound propagation model is configured to be used for estimating a direction-of-arrival of the target sound signal relative to the user.

20 Claims, 5 Drawing Sheets

(56) References Cited

U.S. PATENT DOCUMENTS

2018/0020298 A1* 1/2018 Sonova ............... H04R 25/552
381/23.1

OTHER PUBLICATIONS

Farmani et al., "Informed Direction of Arrival Estimation Using a Spherical-Head Model for Hearing Aid Applications," 2016 IEEE International Conference on Acoustics, Speech and Signal Processing (ICASSP), INSPEC Accession No. 16021462, Mar. 20-25, 2016, 6 pages.

Farmani et al., "Informed TDoA-based Direction of Arrival Estimation for Hearing Aid Applications," 2015 IEEE Global Conference on Signal and Information Processing (GlobalSIP), INSPEC Accession No. 15807779, Dec. 14-15, 2015, 6 pages.

Courtois et al., "Development and Assessment of a Localization Algorithm Implemented in Binaural Hearing Aids", 23rd European Signal Processing Conference (EUSIPCO), XP055249766, Aug. 31, 2015, pp. 2321-2325, p. 2321-2323, figure 1.

Courtois et al., "Implementation of a binaural localization algorithm in hearing aids: specifications and achievable solutions", AES Convention 136; Apr. 25, 2014, New York, USA, XP040637055, 10 pages, pp. 3, 5, 6; figure 1.

Farmani et al. "Maximum Likelihood Approach to "Informed" Sound Source Localization for Hearing Aid Applications", 2015 IEEE International Conference on Acoustics, Speech and Signal Processing (ICASSP), Apr. 1, 2015, pp. 16-20, XP055249035, DOI: 10.1109/ICASSP.2015.7177923, ISBN: 978-1-4673-6997-8, pp. 16-18; figure 1.

Raspaud et al., "Binaural Source Localization by Joint Estimation of ILD and ITD", IEEE Transactions on Audio, Speech, and Language Processing, IEEE Service Center, New York, USA, vol. 18, No. 1, Jan. 1, 2010, pp. 68-77, XP011329111, ISSN: 1558-7916, DOI: 10.1109/TASL.2009.2023644: pp. 71-73. Figures 5, 8.

Knapp et al., "The Generalized Correlation Method for Estimation of Time Delay," IEEE Transactions on Acoustics, Speech, and Signal Processing, vol. ASSP-24, No. 4, Aug. 1, 1976, pp. 320-327.

* cited by examiner $$d_1 = \sqrt{(d\sin(\theta))^2 + \left(d\cos(\theta) - \frac{a}{2}\right)^2}$$

$$d_2 = \sqrt{(d\sin(\theta))^2 + \left(d\cos(\theta) + \frac{a}{2}\right)^2}$$

HEARING DEVICE AND A HEARING SYSTEM CONFIGURED TO LOCALIZE A SOUND SOURCE

SUMMARY

The present disclosure deals with the problem of estimating the direction to one or more sound sources of interest—relative to the hearing aids (or the nose) of the hearing aid user. We assume that the target sound sources are equipped with wireless transmission capabilities and that the target sound is transmitted via this wireless link to the hearing aid(s) of a hearing aid user. Hence, the hearing aid system receives the target sound(s) acoustically via its microphones, and wirelessly, e.g., via an electro-magnetic transmission channel (or other wireless transmission options). Given i) the received acoustical signal which consists of the target sound and potential background noise, and ii) the wireless target sound signal, which is (essentially) noise-free because the wireless microphone is close to the target sound source, the goal of the present disclosure is to estimate the location of the target sound source, relative to the hearing aid system. The term 'noise free' is in the present context (the wirelessly propagated target signal) taken to mean 'essentially noise-free' or 'comprising less noise than the acoustically propagated target sound'.

The target sound source may e.g. comprise a voice of a person, either directly from the persons mouth or presented via a loudspeaker. Pickup of a target sound source and wireless transmission to the hearing aids may e.g. be implemented as a wireless microphone attached to or located near the target sound source (see e.g. FIG. 4), e.g. located on a conversation partner in a noisy environment (e.g. a cocktail party, in a car cabin, plane cabin, etc.), or located on a lecturer in a "lecture-hall situation", etc. Alternatively it may be music or other sound played live or presented via one or more loudspeakers. The target sound source could also be a communication device with wireless transmission capability, e.g. a radio/tv comprising a transmitter, which transmits the sound signal wirelessly to the hearing aids.

It is advantageous to estimate the location (and/or the delay between the microphones) of the target sound sources for several purposes: 1) the target sound source may be "binauralized" i.e., processed and presented binaurally to the hearing aid user with correct spatial cues—in this way, the wireless signal will sound as if originating from the correct spatial position, 2) noise reduction algorithms in the hearing aid system may be adapted to the presence of this known target sound source at this known position, 3) visual (or by other means) feedback—e.g., via a cellphone or a tablet computer—to the hearing aid user about the location of the wireless microphone(s), either as simple information or as part of a user interface, where the hearing aid user can control the appearance (volume, etc.) of the various wireless sound sources.

Our co-pending European patent application (no. 14189708.2, filed on 21, Oct. 2014, and having the title 'Hearing system') also deals with the topic of sound source localization in a hearing aid. However, compared to that, the present disclosure differs in that it is a) computationally simpler, b) cheaper in terms of memory complexity and c) restricted to M=2 microphones. The solution proposed in the present disclosure 1) is able to take into account the presence of the background noise, which will always be present at the microphones in addition to the acoustic target signal, and 2) is able to (in addition to 1)) take into account the fact that sounds impinging on the hearing aid microphones are filtered by the head, which will generally improve performance.

In an aspect, a hearing device adapted to be worn at or on the head of a user is provided. The hearing device comprises
- at least one input transducer for converting an input sound comprising mixture of a) a target sound signal from a target sound source and b) a possible additive noise sound signal from the environment to a noisy electric input signal;
- at least one wireless receiver for receiving a wirelessly transmitted version of the target signal and providing an essentially noise-free target signal;
- a signal processing unit connected to said at least one input transducer and to said at least one wireless receiver, the signal processing unit comprising
  - a (e.g. configurable) sound propagation model of an acoustic propagation channel from the target sound source to the hearing device when worn by the user, the sound propagation model being configured to be used for estimating a direction-of-arrival of the target sound signal relative to the user.

In an embodiment, the at least one input transducer comprises at least one microphone.

In an embodiment, the sound propagation model is frequency independent. In other words, it is assumed that all frequencies is attenuated and delayed in the same way (full band model). This has the advantage of allowing computationally simple solutions (suitable for portable devices with limited processing and/or power capacity). In an embodiment, the sound propagation model is frequency independent in a frequency range (e.g. below a threshold frequency, e.g. 4 kHz), which form part of the frequency range of a frequency range of operation of the hearing device (e.g. between a minimum frequency ($f_{min}$, e.g. 20 Hz or 50 Hz or 250 Hz) and a maximum frequency ($f_{max}$, e.g. 8 kHz or 10 kHz). In an embodiment, the frequency range of operation of the hearing device is divided into a number (e.g. two or more) of sub-frequency ranges, wherein frequencies are attenuated and delayed in the same way within a given sub-frequency range (but differently from sub-frequency range to sub-frequency range).

In an embodiment, the sound propagation model comprises a far field model.

In an embodiment, the sound propagation model results in (allows) interaural time differences (ITD) and inter aural level differences (ILD) (to) being estimated by $$ILD = K_1 \sin(\theta) \text{[relative level]}$$

$$ITD = K_2 \theta + K_3 \sin(\theta) \text{[time], respectively,}$$

where $K_1$, $K_2$, and $K_3$ are constants to be chosen, and $\theta$ is the angle of the direction-of-arrival of the target sound source relative to a reference direction.

In an embodiment, the reference direction is defined by the user (and/or by the location of first and second (left and right) hearing devices on the body (e.g. the head, e.g. at the ears) of the user), e.g. defined relative to a line perpendicular to a line through the first and second input transducers (e.g. microphones) of the first and second (left and right) hearing devices, respectively. In an embodiment, the first and second input transducers of the first and second hearing devices, respectively, are assumed to be located on opposite sides of the head of the user (e.g. at or on or in respective left and right ears of the user).

In an embodiment, the relative level of ILD is determined in dB. In an embodiment, the time of ITD is determined in s (seconds) or a number of time samples (each time sample being defined by a sampling rate).

In an embodiment, the sound propagation model comprises a free field model. In an embodiment, the model parameters $K_i$ are chosen to be $(K_1, K_2, K_3)=(0, 0, a/c)$. With these choices, the presence of the head of the hearing aid user (free-field assumption) is neglected, and it is assumed that the target source is infinitely far away (far field assumption). Thereby, the "shadowing effect" of the user's head is disregarded. In this model, the ILD (taken to be) zero, and ITD=$(a/c)\sin(\theta)$, where a is distance between respective first and second input transducers (e.g. microphones) located at first (left) and second (right) ears of the user (cf. FIG. 2A), c is the speed of sound, and $\theta$ is the angle of the direction-of-arrival of the target sound source relative to a reference direction defined by the user (e.g. a 'look direction of the user, e.g. defined by a line midway between the ears of the user perpendicular to a vertical plane through the ears of the user, cf. e.g. FIGS. 1, 2, 3). This has the advantage of allowing computationally simple solutions (suitable for portable devices with limited processing and/or power capacity).

In an embodiment, the sound propagation model comprises a spherical head model. In an embodiment, the model parameters $K_i$ (i=1, 2, 3) are chosen to be $(K_1, K_2, K_3)=(\gamma, a/(2c), a/(2c))$, where $\gamma$ is a constant. This implements a crude solid-sphere head model (cf. FIG. 2B). In this model, the ILD is modeled as $\gamma \sin(\theta)$, and ITD is modeled as $(a/2c)(\sin(\theta)+\theta)$, where a, c and $\theta$ are defined above. This implements a relatively crude solid-sphere head model. Here, the ILD is 0 dB for $\theta=0$ (sound from the front), and has its maximum for sounds from +−90 degrees (the sides). The expression for ITD is Woodworth's model (see [2] for details). This has the advantage of allowing computationally simple solutions (suitable for portable devices with limited processing and/or power capacity).

In an embodiment, the sound propagation model comprises a signal model and a head model. In an embodiment, the head model comprises a free-field model. In an embodiment, the head model comprises a spherical head model.

In an embodiment, the hearing device comprises a time to time-frequency conversion unit for converting an electric input signal in the time domain into a representation of the electric input signal in the time-frequency domain, providing the electric input signal at each time instance 1 in a number for frequency bins k, k=1, 2, ..., N. In an embodiment, the time to time-frequency conversion unit comprises a filter bank. In an embodiment, the time to time-frequency conversion unit comprises a Fourier transformation unit, e.g. comprising a Fast Fourier transformation (FFT) algorithm, or a Discrete Fourier Transformation (DFT) algorithm, or a short time Fourier Transformation (STFT) algorithm.

In an embodiment, the signal processing unit is configured to provide a maximum-likelihood estimate of the direction of arrival $\theta$ of the target sound signal.

In an embodiment, the sound propagation model of an acoustic propagation channel from the target sound source to the hearing device when worn by the user comprises a signal model defined by $$R(l,k)=S(l,k)\tilde{H}(k,\theta)+V(l,k)$$

where $R(l, k)$ is a time-frequency representation of the noisy target signal, $S(l, k)$ is a time-frequency representation of the noise-free target signal, $\tilde{H}(k, \theta)$ is a frequency transfer function of the acoustic propagation channel from the target sound source to the respective input transducers of the hearing device, and $V(l, k)$ is a time-frequency representation of the additive noise.

In an embodiment, the signal processing unit is configured to provide a maximum-likelihood estimate of the direction of arrival $\theta$ of the target sound signal by finding the value of $\theta$, for which the likelihood function $$\tilde{L} = \sum_{k=1}^{N} \{-(Z(l,k))^H C_v^{-1}(Z(l,k))\}$$

is maximum, wherein $Z(l, k)=R(l,k)-S(l,k)\hat{H}(k,\theta)$ is a is a time-frequency representation of an estimate of the additive noise, and $C_v(l, k)$ is the inter-input transducer noise covariance matrix. In an embodiment, the frequency transfer function $\hat{H}$ is assumed to be independent of the direction of arrival $\theta$.

In an embodiment, the at least one input transducer of the hearing device is one or two (in the meaning comprises, such as consists of, one or two input transducers). In an embodiment, the at least one input transducer comprises at least one microphone, e.g. two.

In an embodiment, the hearing device is configured to determine whether a signal arrives from a front or a rear half plane relative to a user. In an embodiment, the hearing device comprises at least two input transducers arranged to be spatially separated in such a way that a first one is located more towards the front half plane of the user than a second one of the at least two input transducers When the hearing device is operationally mounted on the user). In an embodiment, the origin of a signal in a front or in a rear half plane relative to a user is determined by comparing a time of arrival of the signal at the first (front) and second (rear) one of the at least two input transducers.

In an embodiment, the hearing system is configured to calculate the direction-of-arrival (only) in case the likelihood function is larger than a threshold value. Thereby, power can be saved in cases where the conditions for determining a reliable direction-of-arrival of a target sound are poor. In an embodiment, the wirelessly received sound signal is not presented to the user when no direction-of-arrival has been determined. In an embodiment, a mixture of the wirelessly received sound signal and the acoustically received signal is presented to the user.

In an embodiment, the hearing device comprises a beamformer unit and the signal processing unit is configured to use the estimate of the direction of arrival of the target sound signal relative to the user in the beamformer unit to provide a beamformed signal comprising the target signal. In an embodiment, the signal processing unit is configured to apply a level and frequency dependent gain to an input signal comprising the target signal and to provide an enhanced output signal comprising the target signal. In an embodiment, the hearing device comprises an output unit adapted for providing stimuli perceivable as sound to the user based on a signal comprising the target signal. In an embodiment, the hearing device is configured to estimate head related transfer functions based on the estimated interaural time differences and inter aural level differences.

In an embodiment, the hearing device (or system) is configured to switch between different sound propagation models depending on a current acoustic environment and/or on a battery status indication. In an embodiment, the hearing device (or system) is configured to switch to a (computationally) lower sound propagation model based on an indication from a battery status detector that the battery status is relatively low.

In an embodiment, the hearing device comprise a hearing aid, a headset, an earphone, an ear protection device or a combination thereof.

In an aspect, a hearing system comprising first and second hearing devices as described above, in the detailed description of embodiments, in the claims and drawings is provided. The first and second hearing devices are adapted to be located at or in first and second ears, respectively, of the user. In an embodiment, the first and second hearing devices each comprises antenna and transceiver circuitry configured to allow an exchange of information between them, e.g. status, control and/or audio data. In an embodiment, the first and second hearing devices are configured to allow an exchange of data regarding the direction-of-arrival as estimated in a respective one of the first and second hearing devices to the other one.

In an embodiment, the hearing system is configured to estimate a target source to input transducer propagation delay for the first and second hearing devices. In an embodiment, the hearing device is configured to determine a difference between the target source to input transducer propagation delays for the first and second hearing devices.

In an embodiment, the hearing device comprises one or more detectors for monitoring a current input signal of the hearing device and/or on the current acoustic environment (e.g. including one or more of a correlation detector, a level detector, a speech detector).

In an embodiment, the hearing device comprises a level detector (LD) for determining the level of an input signal (e.g. on a band level and/or of the full (wide band) signal).

In an embodiment, the hearing device comprises a voice activity detector (VAD) configured to provide control signal comprising an indication (e.g. binary, or probability based) whether an input signal (acoustically or wirelessly propagated) comprises a voice at a given point in time (or in a given time segment).

In an embodiment, the hearing device (or system) is configured to switch between local and informed estimation direction-of-arrival depending of a control signal, e.g. a control signal from a voice activity detector. In an embodiment, the hearing device (or system) is configured to only determine a direction-of-arrival as described in the present disclosure, when a voice is detected in an input signal, e.g. when a voice is detected in the wirelessly received (essentially) noise-free signal. Thereby power can be saved in the hearing device/system.

In an embodiment, the hearing device comprises a battery status detector providing a control signal indication a current status of the battery (e.g. a voltage, a rest capacity or an estimated operation time).

Definitions

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit for processing the input audio signal and an output means for providing an audible signal to the user in dependence on the processed audio signal. In some hearing devices, an amplifier may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory cortex and/or to other parts of the cerebral cortex.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Auxiliary devices may be e.g. remote controls, audio gateway devices, mobile phones (e.g. SmartPhones), public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

DETAILED DESCRIPTION OF EMBODIMENTS

The problem addressed by the present disclosure is to estimate the location of the target sound source. To do so, we make some assumptions about the signals reaching the microphones of the hearing aid system and about their propagation from the emitting target source to the microphones. In the following, we outline these assumptions.

Figure 1A:
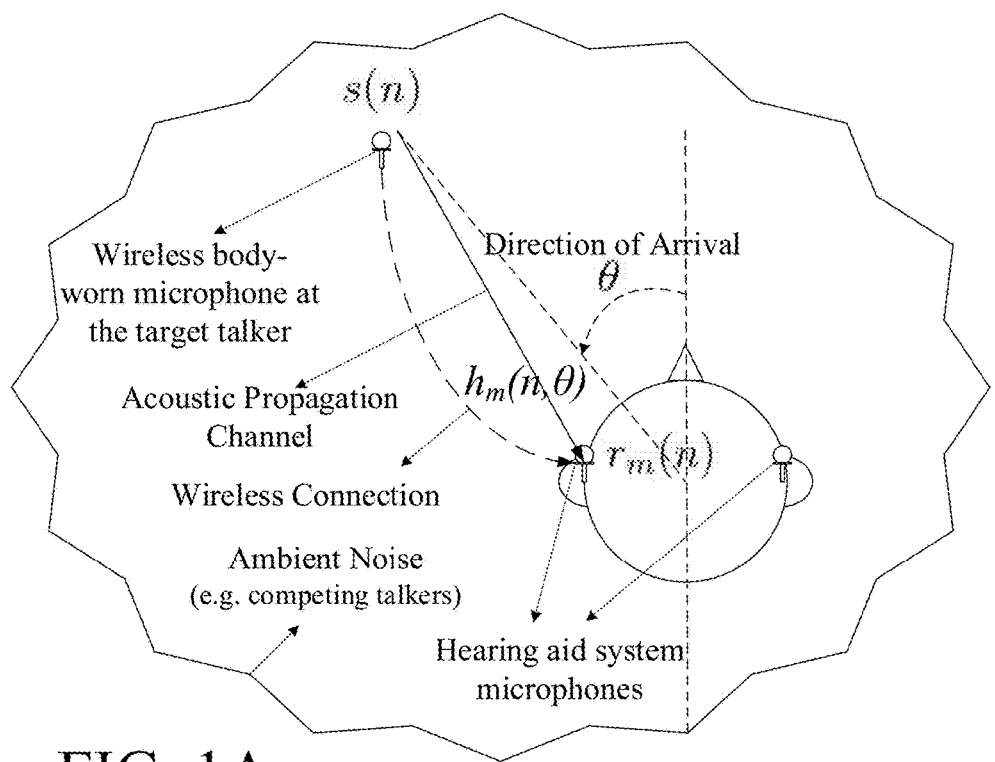
FIG. 1A shows an "informed" binaural direction of arrival (DoA) estimation scenario for a hearing aid system using a wireless microphone, wherein $r_m(n)$, $s(n)$ and $h_m(n, \theta)$ are the noisy received sound at microphone m, the (essentially) noise-free target sound, and the acoustic channel impulse response between a target talker and microphone m, respectively.

FIG. 1A illustrates a relevant scenario. A speech signal s(n) (a target signal, n being a time index) generated by a target talker (signal source) and picked up by a microphone at the talker (cf. Wireless body-worn microphone at the target talker) is transmitted through an acoustic channel $h_m(n, \theta)$ (transfer function of the Acoustic Propagation Channel) and reaches microphone m (m=1, 2) of a hearing system, e.g. comprising first and second a hearing aids (cf. Hearing aid system microphones). Due to (potential) additive environmental noise (cf. Ambient Noise (e.g. competing talkers)), a noisy signal $r_m(n)$ is received at microphone m (here a microphone of a left hearing device). The essentially noise-free target signal s(n) is transmitted to the hearing device via a wireless connection (cf. Wireless Connection) (the term 'essentially noise-free target signal s(n)' indicates the assumption that s(n)—at least typically—comprises less noise than the signal $r_m(n)$ received by the microphones at the user). An aim of the present disclosure is to estimate the direction of arrival (DoA) (cf. Direction of Arrival) of the target signal relative to the user using these signals (cf. angle $\theta$ relative to a direction defined by dashed line through the user's nose).

Figure 1B:
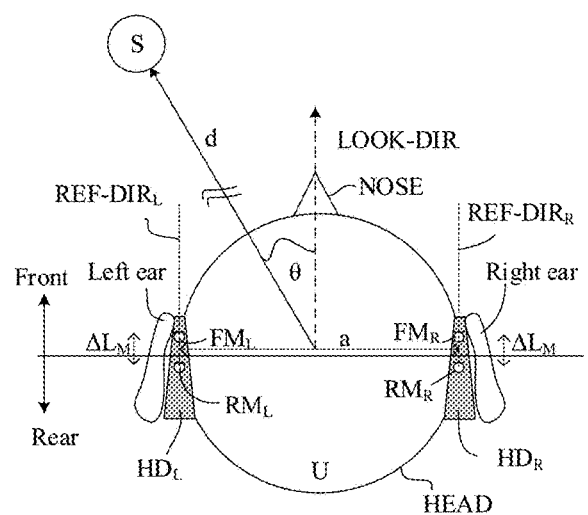
FIG. 1B schematically illustrates a geometrical arrangement of sound source relative to a hearing aid system comprising first and second hearing devices when located at or in first (left) and second (right) ears, respectively, of the user.

FIG. 1B schematically illustrates a geometrical arrangement of sound source relative to a hearing aid system comprising first and second hearing devices ($HD_L$, $HD_R$) when located on the head (HEAD) at or in first (Left ear) and second (Right ear) ears, respectively, of a user (U). The setup is similar to the one described above in connection with FIG. 1A. Front and rear directions and front and rear half planes of space (cf. arrows Front and Rear) are defined relative to the user (U) and determined by the look direction (LOOK-DIR, dashed arrow) of the user (defined by the user's nose (NOSE)) and a (vertical) reference plane through the user's ears (solid line perpendicular to the look direction (LOOK-DIR)). The left and right hearing devices ($HD_L$, $HD_R$) each comprise a BTE-part located behind-the-ear (BTE) of the user. Each BTE-part comprises two microphones, a front located microphone ($FM_L$, $FM_R$) and a rear located microphone ($RM_L$, $RM_R$) of the left and right hearing devices, respectively. The front and rear microphones on each BTE-part are spaced apart at a distance $\Delta L_M$ along a line (substantially) parallel to the look direction (LOOK-DIR), see dotted lines REF-$DIR_L$ and REF-$DIR_R$, respectively. As in FIG. 1A, a target sound source S is located at a distance d from the user and having a direction-of-arrival defined (in a horizontal plane) by angle $\theta$ relative to a reference direction, here a look direction (LOOK-DIR) of the user. In an embodiment, the user U is located in the far field of the sound source S (as indicated by broken solid line d).

Signal Model:

Generally, we assume a signal model of the form (cf. e.g. [2], Eq. (1)) describing the noisy signal received by the $m^{th}$ input transducer (e.g. microphone m):

$$r_m(n)=s(n)*h_m(n,\theta)+v_m(n), (m=\{left,right\} \text{ or } \{1,2\}). \quad [2] (1)$$

where s, $h_m$, and $v_m$ are the (essentially) noise-free target signal emitted at the target talker's position, the acoustic channel impulse response between the target talker and microphone m, and an additive noise component, respectively. $\theta$ is the angle of the direction-of-arrival of the target sound source relative to a reference direction defined by the user (and/or by the location of the first and second (left and right) hearing devices on the body (e.g. the head, e.g. at the ears) of the user), n is a discrete time index, and * is the convolution operator. In an embodiment, a reference direction is defined by a look direction of the user (e.g. defined by the direction that the user's nose point in (when seen as an arrow tip)). In an embodiment, we operate in the short-time Fourier transform domain (STFT), which allows us to write all involved quantities as functions of a frequency index k, a time (frame) index l, and the direction-of-arrival (angle) $\theta$. The relevant quantities are given by, Eqs. (2-10) below (cf. also [2]).

Most state-of-the-art hearing aids operate in the short time Fourier transform (STFT) domain because it allows frequency dependent processing, computational efficiency and the ability to adapt to the changing conditions. Therefore, let $R_m(l, k)$, $S(l, k)$ and $V_m(l, k)$ denote the STFT of $r_m$, s and $v_m$, respectively. In an embodiment, it is assumed that S also includes source (e.g. mouth) to microphone transfer function and microphone response. Specifically, $$R_m(l, k) = \sum_n r_m(n)w(n - lA)e^{-\frac{j2\pi k}{N}(n-lA)}, \quad [2] (2)$$

where m={left, right}, l and k are frame and frequency bin indexes, respectively, N is the frame length, A is a decimation factor, w(n) is the windowing function, and $j=\sqrt{(-1)}$ is the imaginary unit. We define S(l, k) and $V_m$(l, k) similarly. Moreover, let $H_m$(k, θ) denote the Discrete Fourier Transform (DFT) of $h_m$:

$$H_m(k, \theta) = \sum_n h_m(n, \theta) e^{-\frac{j2\pi kn}{N}}, \quad [2] (3)$$

$$= \alpha_m(k, \theta) e^{-\frac{j2\pi k}{N} D_m(k,\theta)}, \quad [2] (4)$$

where m={left, right}, N is the DFT order, $a_m$(k, θ) is a real number and denotes the frequency-dependent attenuation factor due to propagation effects, and $D_m$(k, θ) is the frequency-dependent propagation time from the target sound source to microphone m. For simplicity and decreasing computation overhead we may use the Fast Fourier transformation (FFT) algorithm to calculate STFT to model the acoustic channel as a function that delays and attenuates its input signals uniformly across frequencies, i.e.

$$\tilde{H}_m(k, \theta) = \tilde{\alpha}_m(\theta) e^{-\frac{j2\pi k}{N} \tilde{D}_m(\theta)}, \quad [2] (5)$$

where $\tilde{D}_m(\theta)$ and $\tilde{\alpha}_m(\theta)$ are constant across frequencies.

Now, we can approximate Eq. (1) in the STFT domain as:

$$R_m(l,k) = S(l,k)\tilde{H}_m(k,\theta) + V_m(l,k). \quad [2] (6)$$

Collecting the microphone equations (Eq. (6)) in a column vector leads to the following signal model:

$$R(l,k) = S(l,k)\tilde{H}(k,\theta) + V(l,k), \quad [2] (7)$$

where $$R(l,k) = [R_{left}(l,k), R_{right}(l,k)]^T, \quad [2] (8)$$

$$\tilde{H}(k,\theta) = [\tilde{H}_{left}(k,\theta), \tilde{H}_{right}(k,\theta)]^T, \quad [2] (9)$$

$$V(l,k) = [V_{left}(l,k), V_{right}(l,k)]^T, \quad [2] (10)$$

and the superscript denotes the transpose operator.

Maximum Likelihood Framework.

The general goal is to estimate the direction-of-arrival θ using a maximum likelihood framework. To this end, we assume that the (complex-valued) noise DFT coefficients follow a Gaussian distribution as illustrated in Eq. (11) below for the additive noise (cf. e.g. also [2]).

To define the likelihood function, we assume the additive noise V(l, k) as expressed in Eq. (10) above is distributed according to a zero-mean circularly-symmetric complex Gaussian distribution:

$$V(l,k) \sim \aleph(0, C_v(l,k)), \quad [2] (11)$$

where $C_v(l, k) = E\{V(l, k)V^H(l, k)\}$ is the inter-input transducer (e.g. inter-microphone) noise covariance matrix, and where E{.} and superscript $^H$ represent the expectation and Hermitian transpose operators, respectively. Since S(l, k) is available at the hearing assistance system, we can relatively easily determine the time-frequency regions in the noisy microphone signals where the target speech is essentially absent. Therefore, we adaptively estimate $C_v(l, k)$ (e.g. as $C_v(n+1) = \alpha'C_v(n-1)+(1-\alpha')C_v(n)$, where α' is a step size, an n is a time index) using exponential smoothing over the frames where the noise is dominant. Moreover, we assume the noisy observations are independent across frequencies. Therefore, the likelihood function for each frame is defined by:

$$p(\underline{R}(l) | S(l), \underline{\tilde{H}}(\theta), \underline{C_v}(l)) = \quad [2] (12)$$

$$\prod_{k=1}^{N} \frac{1}{\pi^M |C_v(l,k)|} e^{\{-(Z(l,k))^H C_v^{-1}(l,k)(Z(l,k))\}},$$

where |.| denotes the matrix determinant, N is the number of frequency indexes, and $$\underline{R}(l) = [R(l, 1), R(l, 2), \ldots, R(l, N)],$$

$$R(l, k) = [R_{left}(l, k), R_{right}(l, k)]^T, 1 \leq k \leq N,$$

$$\underline{S}(l) = [S(l, 1), S(l, 2), \ldots, S(l, N)]^T,$$

$$\underline{\tilde{H}}(\theta) = [\tilde{H}(1, \theta), \tilde{H}(2, \theta), \ldots, \tilde{H}(N, \theta)]$$

$$\tilde{H}(k, \theta) = [\tilde{H}_{left}(k, \theta), \tilde{H}_{right}(k, \theta)]^T$$

$$= \begin{bmatrix} \tilde{\alpha}_{left}(\theta) e^{-\frac{j2\pi k}{N} \tilde{D}_{left}(\theta)} \\ \tilde{\alpha}_{right}(\theta) e^{-\frac{j2\pi k}{N} \tilde{D}_{right}(\theta)} \end{bmatrix}, 1 \leq k \leq N,$$

$$\underline{C_v}(l) = [C_v(l, 1), C_v(l, 2), \ldots, C_v(l, N)]^T,$$

$$Z(l, k) = R(l, k) - S(l, k)\tilde{H}(k).$$

The corresponding log-likelihood function L is given by:

$$L = -M N \log \pi - \Sigma_{k=1}^{N} \log|C_v(l,k)| + \Sigma_{k=1}^{N}\{-(Z(l,k))^H C_v^{-1}(l,k)(Z(l,k))\}. \quad [2] (13)$$

Assuming that noisy DFT coefficients are statistically independent across frequency k, the likelihood function for a given frame (with index l) is given by Eq. (12) (including the many equations after Eq. (12)).

Discarding terms in Eq. (12) that do not depend on θ, we arrive at Eq. (14).

Aiming at estimating only Maximum Likelihood Estimates (MLEs) in dependence of θ, contributions to L in Eq. (13) that do not depend on θ (e.g. the first two parts $-M N \log \pi - \Sigma_{k=1}^{N} \log|C_v(l, k)|$) are ignored in the reduced log-likelihood function:

$$\tilde{L} = \Sigma_{k=1}^{N}\{-(Z(l,k))^H C_v^{-1}(l,k)(Z(l,k))\}. \quad [2] (14)$$

Head Model

Generally, we consider microphones which are located on/at one or both ears of a hearing aid user. It is well-known that the presence of the head influences the sound before it reaches the microphones, depending on the direction of the sound. In the following, we outline methods (all based on the maximum likelihood framework above), which differ in the way the head presence is taken into account. In the proposed framework, the head presence may be taken into account using models of the inter-aural level differences (ILD's) and inter-aural time differences (ITD's) between microphones of first and second hearing devices located on opposite sides of a user' head (e.g. at a user's ears).

Although ILD's and ITD's are conventionally defined with respect to the acoustic signals reaching the ear drums of a human, we stretch the definition to mean the level- and time-differences between microphone signals (where the microphones are typically located at/on the pinnae of the user, cf. e.g. FIG. 1B). This microphone related definition of ILD and ITD may also be termed the Inter Microphone Time difference (IMTD) and the Inter Microphone Level difference (IMLD), respectively.

ITDs and ILDs are functions of angle-of-arrival θ (in a horizontal plane, cf. FIG. 1), and frequency. In the proposed framework, however, we use relatively crude models which are frequency-independent. We do this to arrive at solutions, which are computationally simple (and thus e.g. well-suited for electronic devices subject to power and/or space constraints, e.g. portable devices, e.g. miniature devices, e.g. hearing aids). The approaches of [1] and [2] may be described in terms of the following generalized ITD/ILD models:

$$ILD = K_1 \sin(\theta) [dB]$$

$$ITD = K_2\theta + K_3 \sin(\theta) [\text{time}],$$

where $K_1$, $K_2$, and $K_3$ are constants to be chosen.

In a first example (as further elucidated in [1]), the following parameter choices are made $$(K_1, K_2, K_3) = (0, 0, a/c),$$

where a is the microphone distance, and c is the speed of sound. With these choices, strictly speaking, we completely ignore the presence of the head of the hearing aid user (free-field assumption), and we assume that the target source is infinitely far away (far field assumption).

In a second example (as further elucidated in [2]), the following parameter choices are made $$(K_1, K_2, K_3) = (\gamma, a/(2c), a/(2c)),$$

where γ is a constant. This implements a crude solid-sphere head model. Here, the ILD is 0 dB for θ=0 (sound from the front), and has its maximum for sounds from +−90 degrees (the sides). The ITD reflects Woodworth's model (see [2] for details).

Note that both head models are independent of frequency. While these assumptions are obviously not completely valid in practice, they allow for simple solutions (in terms of computational complexity) and surprisingly good performance.

Maximum Likelihood Estimation of θ

The general goal of all proposed algorithms is to find maximum likelihood estimates of the direction (θ) to the wireless microphone. Generally, this is achieved by finding the value of θ, for which the likelihood function Eq. (14) (cf. [2]) is maximum. For M=2 microphones, the likelihood function is obviously a function of the two microphone signals. But since the head models discussed above impose certain (assumed) relations between microphone signals, the detailed expression for the likelihood function depends on the head model used. In the following, we outline algorithms based on the free field model $(K_1, K_2, K_3) = (0, 0, a/c)$, and on the solid-sphere model $(K_1, K_2, K_3) = (\gamma, a/(2c), a/(2c))$, respectively.

Informed Direction-of-Arrival Estimation—Free-Field Model

In the following we use the free-field model described above (as described in detail in [1]). This leads to a rather simple expression for the likelihood function, which can be maximized for the angle-of-arrival θ. We consider solutions where the number of microphones equal M=2 and M=1, respectively, and where different assumptions are made with respect to the background noise.

Figure 2A:
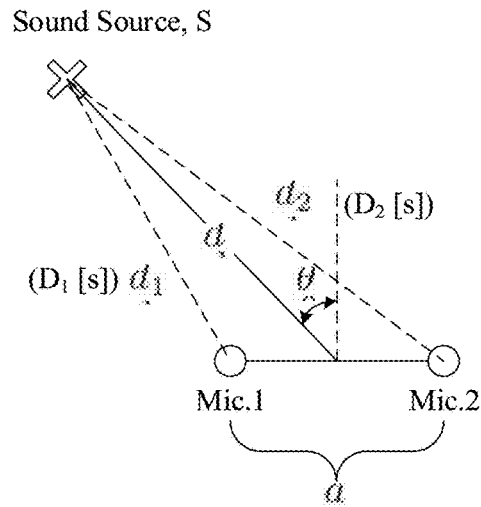
FIG. 2A illustrates a geometrical arrangement of first and second microphones of a binaural hearing aid system relative to a sound source in a free field scenario.

FIG. 2A illustrates a geometrical arrangement of first and second microphones (Mic. 1, Mic. 2, respectively) of a binaural hearing aid system relative to a sound source (Sound Source S) in a free field scenario. The sound source S is located a distance d from a reference point in the user's head midway between ears of the user at an angle θ relative to a reference, as illustrated tin FIG. 2. The first and second microphones (Mic. 1, Mic. 2) are located on the head of a user (e.g. at the ears) separated a distance a (the distance between the ears), at a distance of $d_1$ and $d_2$, respectively, to the sound source S. The propagation time $D_1$, $D_2$ of the signal (e.g. the target signal) from the sound source S to each microphone (Mic. 1, Mic. 2) is related the distances $d_1$, $d_2$: by $D_m = d_m/c$, where c is speed of sound in air (m=1, 2). Geometrical expressions for $d_1$ and $d_2$, are given in FIG. 2A based on d, θ, and a.

M=2 Microphones, General Noise Covariance—Maximum Likelihood $D_1$ and $D_2$ (or $D_{left}$ and $D_{right}$) represent the frequency-dependent propagation time from the target sound source to microphone m (m=1, 2 or m=left, right, cf. FIG. 2). $D_1$ and $D_2$ (or $D_{left}$ and $D_{right}$) depends on each other via θ as indicated in the below equation (cf. Eq. (6) in [1])

$$D_1 - D_2 = \frac{a}{c}\sin\theta$$

Taking the above relationship into account, and considering the received signals of M=2 microphones together, $D_m$ and θ can be jointly estimated. In an embodiment, the first and second microphones are symmetrically arranged around the reference direction (plane) used for θ (i.e. as defined by θ=0), see e.g. FIGS. 1, 2.

In the following, we find the MLE of θ for two different cases of the inter-microphone noise covariance matrix $C_v(l, k)$. We first consider the general case of $C_v(l, k)$ without any constraints. Afterwards, we assume that the additive noise $V_1$ and $V_2$ at the first and second microphones are uncorrelated, and we model $C_v(l, k)$ as a diagonal matrix to decrease the computation overhead.

1) General $C_v(l, k)$: Let us denote $C_v^{-1}(l, k)$ for M=2 as $$C_v^{-1}(l, k) = \begin{bmatrix} C_{11}(l, k) & C_{12}(l, k) \\ C_{21}(l, k) & C_{22}(l, k) \end{bmatrix}. \quad [1] (16)$$

Furthermore, in a far field and a free field situation, we have that the frequency-dependent attenuation factors due to propagation effects $\alpha_1 = \alpha_2 = \alpha$. Using this assumption, we expand Eq. (13) above for M=2 and note that $D_2 = D_1 - (a/c)\sin(\theta)$. The obtained expansion $\tilde{L}(\theta, \alpha, D_1)$ is a function of θ, α, and $D_1$, and we aim to find the MLE of θ and $D_1$. To eliminate the dependency on α, we substitute the MLE of α in $\tilde{L}(\theta, \alpha, D_1)$. It can be shown that the MLE of α is:

$$\hat{\alpha} = \frac{f(\theta, D_1)}{g(\theta)}, \quad [1] (17)$$

where $$f(\theta, D_1) = \quad [1] (18)$$

$$\sum_{k=1}^{n} \left( C_{11}(l, k)R_1(l, k) + C_{12}(l, k)R_2(l, k) + (C_{21}(l, k)R_1(l, k) + C_{22}(l, k)R_2(l, k))e^{j2\pi\frac{k}{n}[-\frac{a}{c}\sin\theta]} \right) S^*(l, k)e^{j2\pi\frac{k}{N}D_1},$$

-continued and $$g(\theta) = \sum_{k=1}^{N} \left( C_{11}(l,k) + 2C_{21}(l,k)e^{j2\pi\frac{k}{M}\left[-\frac{a}{c}\sin\theta\right]} + C_{22}(l,k) \right) |S(l,k)|^2, \quad [1]\,(19)$$

Inserting $\hat{\alpha}$ into $\hat{L}(\theta, \alpha, D_1)$ provides $$\hat{L}(\theta, D_1) = \frac{f^2(\theta, D_1)}{g(\theta)}, \quad [1]\,(20)$$

In this general case, the likelihood function is given by [1], Eq. (20) (and [1], Eqs. (18, 19)). We wish to find the value of $\theta$ that maximizes the likelihood function. As illustrated in the following, this can be done using Inverse Discrete Fourier Transforms (IDFTs), which are computationally relatively cheap (and thus attractive in a low-power application, e.g. a hearing aid).

An IDFT (efficiently obtained by an IFFT algorithm) is given by the following equation.

$$x(n) = \sum_{k=0}^{N-1} X(k)e^{j2\pi\frac{k}{N}n}, \, n = 1\ldots N$$

In our case, we have $$f(\theta, D_{left}) = \sum_{k=1}^{N} \left( C_{11}(l,k)R_{left}(l,k) + C_{12}(l,k)R_{right}(l,k) + 10^{\frac{\gamma\sin\theta}{20}}(C_{21}(l,k)R_{left}(l,k) + C_{22}(l,k)R_{right}(l,k))e^{j2\pi\frac{k}{N}\left[-\frac{b}{c}(\theta+\sin\theta)\right]} \right) S^*(l,k)e^{j2\pi\frac{k}{N}D_{left}(\theta)},$$

This has an IDFT structure as $$f(\theta, D_{left}) = \sum_{k=0}^{N-1} X(\theta, k)e^{j2\pi\frac{k}{N}D_{left}(\theta)},$$

where $$X(\theta, k) = \left( C_{11}(l,k)R_{left}(l,k) + C_{12}(l,k)R_{right}(l,k) + 10^{\frac{\gamma\sin\theta}{20}}(C_{21}(l,k)R_{left}(l,k) + C_{22}(l,k)R_{right}(l,k))e^{j2\pi\frac{k}{N}\left[-\frac{b}{c}(\theta+\sin\theta)\right]} \right) S^*(l,k)$$

It is noted that the sum is shifted from k=1:N to k=0:(N−1). This is allowed as $$e^{j2\pi\frac{0}{N}D_{left}(\theta)} = e^{j2\pi\frac{N}{N}D_{left}(\theta)}.$$

In the above outline, it is assumed that D is estimated as an integer number. It is further anticipated that the delay D is smaller than N allowing the delay to be within the same frame of both the transmitted clean (essentially noise-free) target signal as well as the recorded target+noise (noisy target) signal.

It is further assumed that the attenuation factors $\alpha_1$, $\alpha_2$ are frequency-independent, which makes their ratio $$\frac{\alpha_1}{\alpha_2}$$

frequency-independent, which again makes $\gamma$ frequency-independent.

From the above outline (and [1] Eq. (18)), it can be seen that $f(\theta, D_1)$ is an IDFT, which can be evaluated efficiently, with respect to $D_1$. Therefore, for a given $\theta$, computing $\hat{L}(\theta, D_1)$ results in a discrete-time sequence, where the MLE of $D_1$ is the time index of the maximum of the sequence. Since $\theta$ is unknown, we consider a discrete set $\Theta$ of different $\theta$s, and compute $\hat{L}(\theta, D_1)$ for each $\theta \in \Theta$. The MLEs of $D_1$ and $\theta$ are then found from the global maximum:

$$[\hat{\theta}, \hat{D}_1] = \arg\max_{\theta\in\Theta, D_1}\hat{L}(\theta, D_1), \quad [1]\,(21).$$

M=2 Microphones, Diagonal Noise Covariance—Maximum Likelihood

If we assume that the noise observed in the two microphone signals is independent (an assumption which is valid for e.g., microphone noise, but which is less valid for external acoustic noise sources, in particular at low frequencies), then the inter-microphone noise covariance matrix $C_v$ becomes diagonal ([1], Eq. (22)).

2) Diagonal $C_v(l, k)$: To decrease the computation overhead and to simplify the solution, let us assume $V_1(l, k)$ and $V_2(l, k)$ are uncorrelated, so that the noise covariance matrix is diagonal:

$$C_v^{-1}(l, k) = \begin{bmatrix} C_{11}(l, k) & 0 \\ 0 & C_{22}(l, k) \end{bmatrix}. \quad [1]\,(22)$$

Following a similar procedure as in the previous section leads to a reduced log-likelihood function $$\hat{L}(\theta, D_1) = \sum_{k=1}^{N} (p(l, k) + q(l, k, \theta))S^*(l, k)e^{j2\pi\frac{k}{N}D_1}, \quad [1]\,(23)$$

where $$p(l, k) = C_{11}(l, k)R_1(l, k), \quad [1]\,(24)$$

$$q(l, k, \theta) = C_{22}(l, k)R_2(l, k)e^{j2\pi\frac{k}{N}\left[-\frac{a}{c}\sin\theta\right]}, \quad [1]\,(24)$$

In this case, the expression for the likelihood function becomes simpler. Specifically, the likelihood function is given by [1], Eq. (23) (and [1] Eqs. (24, 25)). Again, finding the $\theta$ that maximizes the likelihood function can be done using IDFTs, but the computational load in doing so is smaller than above (and generally, performance is also slightly reduced, because the uncorrelated noise assumption is slightly less accurate—see [1], FIGS. 3, 4, 5).

M=1 Microphones—Maximum Likelihood

It is possible to estimate the angle-of-arrival of a target speaker using M=1 microphone versions of the proposed framework (i.e. in case of a binaural hearing system, estimating the respective delays $D_1$, $D_2$ independently for each microphone (m=1,2) of hearing aids $HD_1$, $HD_2$, respectively, and then estimate a DoA from the (individually) determined delays and the head model). Specifically, we can estimate the time it takes for the signal to travel from the target source to each microphone independently—this requires maximizing simple M=1 likelihood functions (cf. [1], Eq. (13)).

$$L_m(D_m) = \sum_{k=1}^{N} \frac{1}{C_v(l,k)} S^*(l,k) R_m(l,k) e^{j2\pi \frac{k}{N} D_m}. \quad [1]\,(13)$$

As above, maximizing this function in terms of the signal travelling time can be done using IDFTs with respect to $D_m$ (cf. [1], Eq.(14)), and the estimate of θ is found using [1], Eq. (15):

$$\hat{D}_m = \operatorname{argmax}_{D_m} L_m(D_m), \, m = 1, 2, \quad [1]\,(14)$$

$$\hat{\theta} = \arcsin\!\left((\hat{D}_1 - \hat{D}_2)\frac{c}{a}\right). \quad [1]\,(15)$$

The expression in [1] (13) can be interpreted as a Generalized Cross Correlation (GCC) function with a weighting function $$\psi(k) = \frac{1}{C_v(l,k)}.$$

M=1 Microphones—"Informed PHAT"

In the following, the proposed methods are compared with the method proposed in [3], which belongs to the "independent delays" class of approaches and which is based on a conventional cross correlation to find $D_1$ and $D_2$. In general, any method based on Generalized Cross Correlation (GCC) method [4] can be used to estimate $D_1$ and $D2$ independently:

$$\hat{D}_m = \operatorname{argmax}_{D_m} \mathcal{R}^{GCC}_{S,R_m}(D_m), \, m = 1, 2, \quad [1]\,(26)$$

$$\mathcal{R}^{GCC}_{S,R_m}(D_m) = \sum_{k=1}^{N} \psi(k) S^*(l,k) R_m(l,k) e^{j2\pi \frac{k}{N} D_m}. \quad [1]\,(27)$$

The method proposed in [1] uses $\psi(k)=1$. PHAT is well-known for non-informed setups, but appears new in the informed setup. We propose an "informed" PHAT weighting function as $$\psi(k) = \frac{1}{|S^*(l,k) R_m(l,k)|}.$$

Informed Direction-of-Arrival Estimation—Spherical Head Model

With further reference to [2], we insert here the crude solid-sphere head model in the likelihood function, cf. [2], Eq. (14) above. Then we maximize the resulting expression with respect to θ to find maximum likelihood estimates. As for the free-field model described above, the simple form of the head model, allows us to find maximum likelihood estimates using (computationally relatively cheap) IDFTs.

Figure 2B:
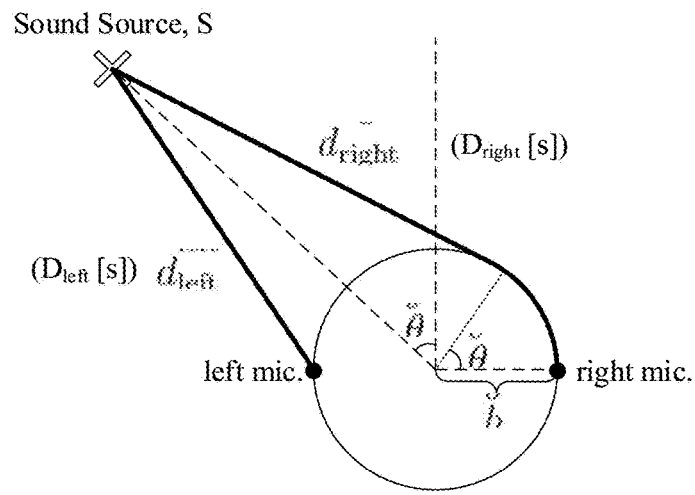
FIG. 2B illustrates a geometrical arrangement of first (left) and second (right) microphones of a binaural hearing aid system relative to a sound source in a spherical head model.

FIG. 2B illustrates a geometrical arrangement of first (cf. left mic.) and second (cf. right mic.) microphones of a binaural hearing aid system relative to a sound source S (cf. Sound Source, S) in a spherical head model (represented by the solid circle in FIG. 2B). The left and right microphones are located a distance 2b apart (=a in FIG. 2A) at the respective ears of the user. In the model of FIG. 2B, the sound is assumed to propagate from the sound source S to the ear of a user along the surface of the user's head (as opposed to the straight line propagation (assumption) of FIG. 2A). The propagation path $d_{right}$ (and propagation delay $D_{right}$) for the right microphone (right mic.) is longer than the propagation path $d_{left}$ (and propagation delay $D_{left}$) for the left microphone (left mic.) as in FIG. 2A ($d_1$, $d_2$) and $D_1$, $D_2$, respectively), but the propagation path $d_{right}$ (and a corresponding propagation delay $D_{right}$) for the right microphone (right mic.) is assumed to be slightly longer than the corresponding propagation path $d_2$ (and corresponding delay $D_2$) in FIG. 2A (due to the curved part of the path following the curvature of the user's head). A direction-of-arrival of the target signal at the user is (as in FIGS. 1, and 2A) defined by angle θ.

M=2 Microphones, General Noise Covariance—Maximum Likelihood

To use the solid-sphere model, one needs to decide on the value of the parameter γ>0. The parameter γ may e.g. be determined in offline simulation experiments. Some possible values of γ are e.g., γ=6, such as γ=2.2, γ=10.7, etc. In general, γ depends on the noise and/or target signal spectra.

Using the solid-sphere head model, it can be shown that the likelihood function can be expressed as [2], Eq. (19) (using Eqs. (20), (21)). As described in [2] this can be maximized with respect to θ using IDFTs.

$$\hat{L}(\theta, D_{left}) = \frac{f^2(\theta, D_{left})}{g(\theta)}, \quad [2]\,(19)$$

where $$f(\theta, D_{left}) = \sum_{k=1}^{N} \Big( C_{11}(l,k) R_{left}(l,k) + C_{12}(l,k) R_{right}(l,k) + \\ 10^{\frac{\gamma \sin \theta}{20}} (C_{21}(l,k) R_{left}(l,k) + C_{22}(l,k) R_{right}(l,k)) \\ e^{j2\pi \frac{k}{N}\left[-\frac{b}{c}(\theta + \sin\theta)\right]} \Big) S^*(l,k) e^{j2\pi \frac{k}{N} D_{left}(\theta)}, \quad [2]\,(20)$$

$$g(\theta) = \sum_{k=1}^{N} \Big( C_{11}(l,k) + 2 \times 10^{\frac{\gamma \sin \theta}{20}} C_{21}(l,k) e^{j2\pi \frac{k}{N}\left[-\frac{b}{c}(\theta + \sin\theta)\right]} + \\ 10^{\frac{\gamma \sin \theta}{20}}(\theta) C_{22}(l,k) \Big) |S(l,k)|^2. \quad [2]\,(21)$$

M=2 Microphones, Diagonal Noise Covariance—Maximum Likelihood

It is straightforward to reduce the expression above by inserting $C_{12}=C_{21}=0$ in the above [2], Eqs. (20, 21) providing below equations (20)' and (21)'.

$$f(\theta, D_{left}) = \\ \sum_{k=1}^{N} \Big( C_{11}(l,k) R_{left}(l,k) + 10^{\frac{\gamma \sin \theta}{20}} (C_{22}(l,k) R_{right}(l,k)) \\ e^{j2\pi \frac{k}{N}\left[-\frac{b}{c}(\theta + \sin\theta)\right]} \Big) S^*(l,k) e^{j2\pi \frac{k}{N} D_{left}(\theta)}, \quad [2]\,(20)'$$

-continued $$g(\theta) = \sum_{k=1}^{N} \left(C_{11}(l,k) + 10^{\frac{\gamma \sin \theta}{20}}(\theta)C_{22}(l,k)\right)|S(l,k)|^2. \quad [2]\,(21)'$$

M=1 Microphones

The solid-sphere head model describes (assumed) relationships between two microphone signals picked up on either side of the head. If only one microphone is available, no such relationship exists. In other words, the spherical head model approach is not applicable to the M=1 microphone situation.

For a person skilled in the art, it is relatively straightforward to generalize the expressions above to the situation where the positions of several wireless microphones must be estimated jointly.

EXAMPLE

An example of a situation where a hearing system according to the present disclosure can be useful is illustrated in FIG. 4.

Figure 4A:
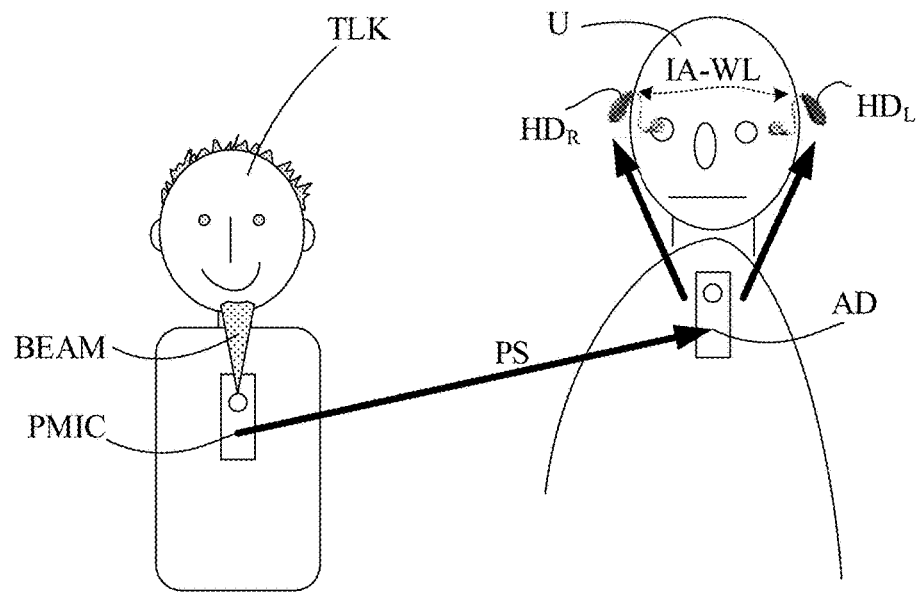
FIG. 4A shows a hearing aid system comprising a partner microphone unit (PMIC), a pair of hearing devices ($HD_l$, $HD_r$) and an (intermediate) auxiliary device (AD).
Figure 4B:
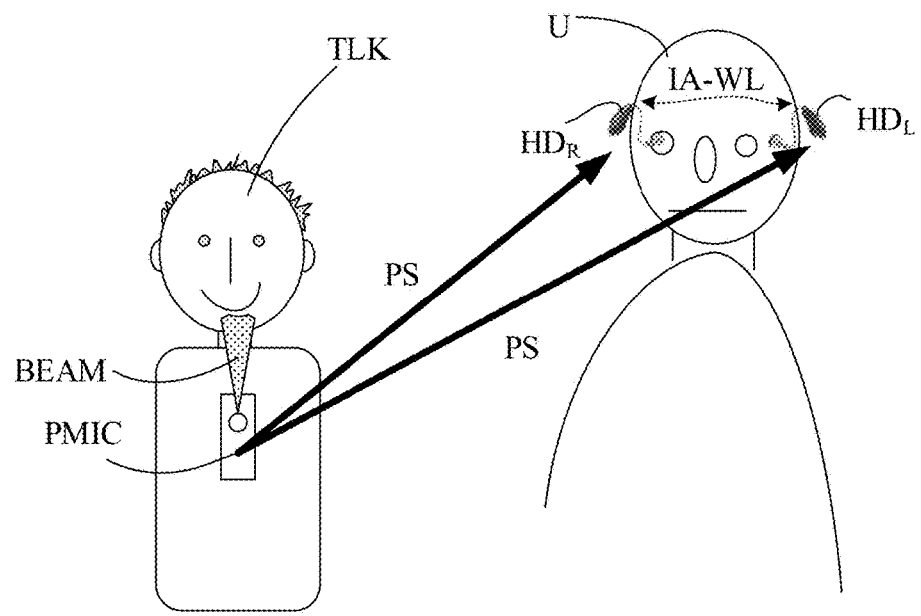
FIG. 4B shows a hearing system comprising a partner microphone unit (PMIC), a pair of hearing devices ($HD_l$, $HD_r$).

FIG. 4 shows two exemplary use scenarios of a hearing system according to the present disclosure comprising a partner microphone unit (PMIC) and a pair of (left and right) hearing devices ($HD_l$, $HD_r$). The left and right hearing devices (e.g. forming part of a binaural hearing aid system) are worn by a user (U) at left and right ears, respectively. The partner microphone is worn by a communication partner or a speaker (TLK), whom the user wishes to engage in discussion with and/or listen to. The partner microphone unit (PMIC) may be a unit worn by a person (TLK) that at a given time only intends to communicate with the user (U). In a particular scenario, the partner microphone unit (PMIC) may form part of a larger system (e.g. a public address system), where the speaker's voice is transmitted to the user (e.g. wirelessly broadcast) and possible other users of hearing devices, and possibly acoustically broadcast via loudspeakers as well. The partner microphone unit may be used in either situation. In an embodiment, the partner microphone unit (PMIC) comprises a multi-input microphone system configured to focus on the target sound source (the voice of the wearer) and hence direct its sensitivity towards its wearer's mouth, cf. (ideally) cone-formed beam (BEAM) from the partner microphone unit to the mouth of the speaker (TLK). The target signal thus picked up is transmitted to the left and right hearing devices ($HD_l$, $HD_r$) worn by the user (U). FIG. 4A and FIG. 4B illustrate two possible scenarios of the transmission path from the partner microphone unit to the left and right hearing devices ($HD_l$, $HD_r$). In embodiments of the present disclosure, the hearing system is configured to exchange information between the left and right hearing devices ($HD_l$, $HD_r$) (such information may e.g. include the propagation delays $D_1$ and $D_2$, (see FIG. 2)), e.g. via an inter-aural wireless link (cf. IA-WL in FIG. 4).

FIG. 4A shows a hearing system comprising a partner microphone (PMIC), a pair of hearing devices ($HD_l$, $HD_r$) and (intermediate) auxiliary device (AD). The solid arrows indicate the path of an audio signal (PS) containing the voice of the person (TLK) wearing the partner microphone unit from the partner microphone unit (PMIC) to the auxiliary device (AD) and on to the left and right hearing devices ($HD_l$, $HD_r$). The (intermediate) auxiliary device (AD) may be a mere relay station or may contain various functionality, e.g. provide a translation from one link protocol or technology to another (e.g. from a far-field transmission technology, e.g. based on Bluetooth to a near-field transmission technology (e.g. inductive), e.g. based on NFC or a proprietary protocol). Alternatively, the two links may be based on the same transmission technology, e.g. Bluetooth or similar standardized or proprietary scheme. The same is may be the case for the optional inter-aural wireless link (IA-WL).

FIG. 4B shows a hearing system comprising a partner microphone unit (PMIC), and a pair of hearing devices ($HD_l$, $HD_r$). The solid arrows indicate the direct path of an audio signal (PS) containing the voice of the person (TLK) wearing the partner microphone unit (PMIC) from the partner microphone unit to the left and right hearing devices ($HD_l$, $HD_r$). The hearing system is configured to allow an audio link to be established between the partner microphone unit (PMIC) and the left and right hearing devices ($HD_l$, $HD_r$), and optionally between the left and right hearing devices ($HD_l$, $HD_r$) via an inter-aural wireless link (IA-WL). The partner microphone unit (PMIC) comprises antenna and transceiver circuitry to allow (at least) the transmission of audio signals (PS), and the left and right hearing devices ($HD_l$, $HD_r$) comprises antenna and transceiver circuitry to allow (at least) the reception of audio signals (PS) from the partner microphone unit (PMIC). The link(s) may e.g. be based on far-field communication, e.g. according to a standardized (e.g. Bluetooth or Bluetooth Low Energy) or proprietary scheme. Alternatively, the inter-aural wireless link (IA-WL) may be based on near-field transmission technology (e.g. inductive), e.g. based on NFC or a proprietary protocol.

Figure 5:
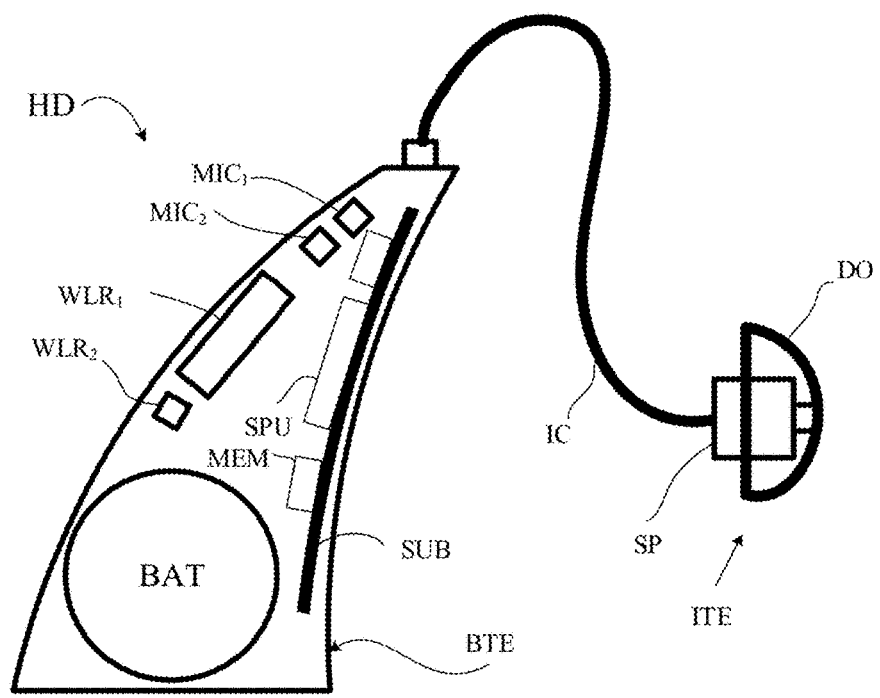
FIG. 5 shows an exemplary hearing device which may form part of a hearing system according to the present disclosure.

FIG. 5 shows an exemplary hearing device, which may form part of a hearing system according to the present disclosure. The hearing device (HD), e.g. a hearing aid, is of a particular style (sometimes termed receiver-in-the ear, or RITE, style) comprising a BTE-part (BTE) adapted for being located at or behind an ear of a user and an ITE-part (ITE) adapted for being located in or at an ear canal of a user's ear and comprising a receiver (loudspeaker). The BTE-part and the ITE-part are connected (e.g. electrically connected) by a connecting element (IC).

In the embodiment of a hearing device in FIG. 5, the BTE part comprises an input unit comprising two input transducers (e.g. microphones) ($MIC_1$, $MIC_2$, corresponding to the front ($FM_x$) and rear ($RM_x$) microphones, respectively, of FIG. 1B) each for providing an electric input audio signal representative of an input sound signal (e.g. a noisy version of a target signal). The input unit further comprises two (individually selectable) wireless receivers ($WLR_1$, $WLR_2$) for providing respective directly received auxiliary audio input signals. In an embodiment, $WLR_1$ is configured to receive an essentially noise-free version of the target signal from a target sound source, and $WLR_2$ is configured to receive information (e.g. related to the localization of the target sound source, e.g. including estimated propagation delays) from a contralateral hearing device of a binaural hearing system, e.g. a binaural hearing aid system. The hearing device (HD) comprises a substrate SUB whereon a number of electronic components are mounted, including a memory (MEM) storing at least two different sound propagation model (parameters defining such models). The BTE-part further comprises a configurable signal processing unit (SPU) adapted to access the memory (MEM) and for selecting and processing one or more of the electric input audio signals and/or one or more of the directly received auxiliary audio input signals, based on a current parameter setting (and/or on inputs from a user interface). The configurable signal processing unit (SPU) provides an enhanced audio signal, which may be presented to a user or further processed or transmitted to another device as the case may be.

The hearing device (HD) further comprises an output unit (e.g. an output transducer or electrodes of a cochlear implant) providing an enhanced output signal as stimuli perceivable by the user as sound based on said enhanced audio signal or a signal derived therefrom In the embodiment of a hearing device in FIG. 5, the ITE part comprises the output unit in the form of a loudspeaker (receiver) (SP) for converting a signal to an acoustic signal. The ITE-part further comprises a guiding element, e.g. a dome, (DO) for guiding and positioning the ITE-part in the ear canal of the user.

The hearing device (HA) exemplified in FIG. 5 is a portable device and further comprises a battery (BAT) for energizing electronic components of the BTE- and ITE-parts. In an embodiment, the hearing device (HA) comprises a battery status detector providing a control signal indication a current status of the battery.

In an embodiment, the hearing device, e.g. a hearing aid (e.g. the signal processing unit), is adapted to provide a frequency dependent gain and/or a level dependent compression and/or a transposition (with or without frequency compression) of one or frequency ranges to one or more other frequency ranges, e.g. to compensate for a hearing impairment of a user.

Figure 3:
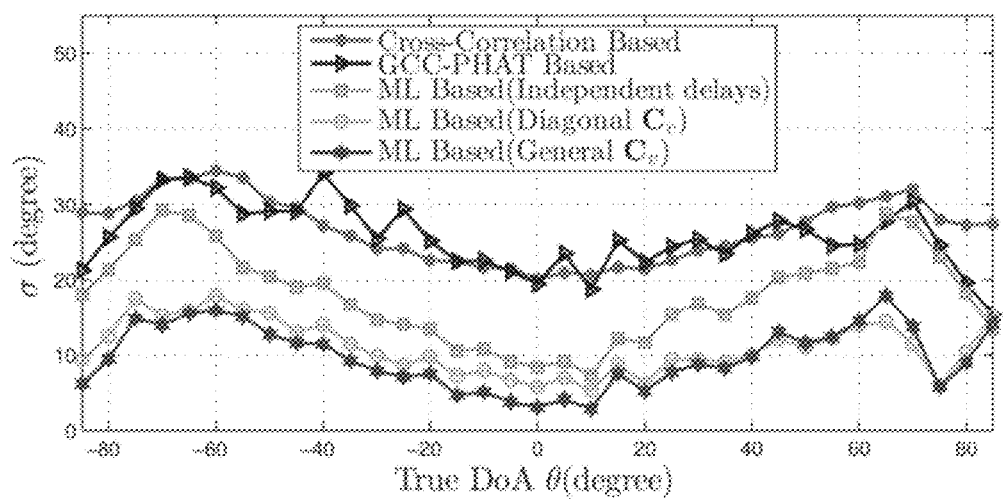
FIG. 3 shows performance as a function of direction of arrival (DoA) represented by the angle $\theta$ at SNR=0 dB for a variety of model scenarios.

In summary, FIG. 3 shows performance as a function of direction of arrival (DoA) represented by the angle $\theta$ at SNR=0 dB for a variety of model scenarios. FIG. 3 shows the mean absolute error (MAE) of five different Direction-of-Arrival (DoA) estimators as a function of $\theta$ at an SNR of 0 dB. The performance metric MAE is given by:

$$\sigma = \frac{1}{L}\sum_{j=1}^{L} |\theta - \hat{\theta}_j|, \quad [1]\ (28)$$

where $\hat{\theta}_j$ is the estimated DoA for the $j^{th}$ frame of the signal. As can be seen, the proposed Maximum Likelihood (ML)-based methods perform better than the Cross-Correlation-based method and the proposed "informed" PHAT method. Among the ML-based methods, the ones which consider dependent delays estimate $\theta$ more accurately, at a higher computation cost. However, using a non-diagonal $C_v$ does not provide considerable improvement compared with modeling $C_v$ as diagonal. The estimators perform worse for $\theta$s towards the sides of the head because the considered far field and free field assumption (i.e. $\alpha_1 = \alpha_2$) is less valid for these $\theta$s.

All in all, three solutions to the estimation of a direction of arrival of a target source have been proposed in the present disclosure.

Solution a): The simplest solution is a one-microphone solution, which estimates the propagation time from target sound source to two microphones—one on each side of the head—independently. That is, this is a one-microphone solution applied twice (wherein the propagation delays $D_1$ and $D_2$, (see FIG. 2) are exchanged, e.g. via an interaural wireless link (cf. IA-WL in FIG. 4)). Given the estimate of the two propagation times, the DOA may be estimated. In FIG. 3 (cf. also [1]), this approach is called ML Based (Independent delays) [local solution].

Solution b) The second solution takes into account that the propagation time from emitter (transmitter) to microphones cannot be very different given the fact that microphones are separated by a distance corresponding to the width of a human head (that is, if one propagation time is 10 s (say), then the other cannot be 20 s (say), because the maximum travelling time between microphones is around 0.5 ms). This approach assumes the background noise to be uncorrelated between microphones—an assumption which theoretically is invalid especially at low frequencies. In FIG. 3 this approach is called ML Based (Diagonal Cv) [informed solution].

Solution c) The third and most advanced (and computationally complex) solution is similar to the second solution with one difference: the background noise is no longer assumed to be uncorrelated between sensors (microphones). In FIG. 3 this approach is called ML Based (General Cv).

Solution a) is the easiest to implement in a hearing aid system and appears better than existing algorithms. Solution b) performs better than Solution a) but is more computationally complex and requires wireless binaural communication; this algorithm is relevant for near-future hearing aid systems. Solution c) is computationally more complex than Solution b) and offers slightly better performance [informed solution].

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[1]: "Informed TDoA-based Direction of Arrival Estimation for Hearing Aid Applications," M. Farmani, M. S. Pedersen, Z.-H. Tan, and J. Jensen, 2015 IEEE Global Conference on Signal and Information Processing (GlobalSIP), 14-16 Dec. 2015, DOI: 10.1109/GlobalSIP.2015.7418338, INSPEC Accession Number: 15807779. 25 Feb. 2016.

[2]: "Informed Direction of Arrival Estimation Using a Spherical-Head Model for Hearing Aid Applications," M. Farmani, M. S. Pedersen, Z.-H. Tan, and J. Jensen, Published in: 2016 IEEE International Conference on Acoustics, Speech and Signal Processing (ICASSP), 20-25 Mar. 2016, DOI: 10.1109/ICASSP.2016.7471697, INSPEC Accession Number: 16021462, 19 May 2016.

[3]: Courtois et al., "Implementation of a binaural localization algorithm in hearing aids: Specifications and achievable solutions," in Audio Engineering Society Convention 136, April 2014, p. 9034.

[4]: C. Knapp and G. C. Carter, "The generalized correlation method for estimation of time delay," IEEE Trans. Acoustics, Speech and Signal Process, vol. 24, no. 4, pp. 320-327, 1976.

The invention claimed is:

1. A hearing system comprising first and second hearing devices, each being adapted to be worn at or on the head or to be fully or partially implanted in the head of a user, the first and second hearing devices being adapted to be located at or in first and second ears, respectively, of the user, and each of the hearing devices comprising:
   at least one input transducer for converting an input sound comprising mixture of a) a target sound signal from a target sound source and b) a possible additive noise sound signal from the environment to a noisy electric input signal;
   at least one wireless receiver for receiving a wirelessly transmitted version of the target signal and providing an essentially noise-free target signal; and
   a signal processing unit connected to said at least one input transducer and to said at least one wireless receiver, the signal processing unit comprising
      a frequency independent sound propagation model of an acoustic propagation channel from the target sound source to the hearing device when worn by the user, the sound propagation model being configured to be used for estimating a direction of arrival of the target sound signal relative to the user,
   wherein the signal processing unit is configured to
      provide a maximum-likelihood estimate of the direction of arrival $\theta$ of the target sound signal based on an additive noise signal model, and
      estimate the value of the direction of arrival $\theta$ that maximizes the likelihood function using Inverse Discrete Fourier Transforms (IDFTs); and
   wherein each of the first and second hearing devices, comprises antenna and transceiver circuitry configured to allow an exchange of information between them, including to allow an exchange of audio data and/or data regarding the direction of arrival as estimated in a respective one of the first and second hearing devices to the other one.

2. A hearing device according to claim 1 wherein the sound propagation model comprises a far field model.

3. A hearing device according to claim 1 wherein the sound propagation model allows interaural time differences (ITD) and inter aural level differences (ILD) to be estimated by $$ILD = K_1 \sin(\theta) \text{[relative level]}$$

$$ITD = K_2 \theta + K_3 \sin(\theta) \text{[time], respectively,}$$

where $K_1$, $K_2$, and $K_3$ are constants to be chosen, and $\theta$ is the angle of the direction of arrival of the target sound source relative to a reference direction.

4. A hearing device according to claim 3 wherein the least one input transducer comprises two microphones, and wherein the constants ($K_1$, $K_2$, $K_3$) are chosen to be equal to or substantially equal to (0, 0, a/c) or to ($\gamma$, a/(2c), a/(2c)), where a is the microphone distance, and c is the speed of sound, and where $\gamma$ is a constant.

5. A hearing device according to claim 1 wherein the sound propagation model comprises a free field model.

6. A hearing device according to claim 1 wherein the sound propagation model comprises a spherical head model.

7. A hearing device according to claim 1 comprising a time to time-frequency conversion unit for converting an electric input signal in the time domain into a representation of the electric input signal in a frequency domain, providing the electric input signal at each time instance 1 in a number for frequency bins k, k=1, 2, . . . , N.

8. A hearing device according to claim 1 wherein the sound propagation model of an acoustic propagation channel from the target sound source to the hearing device when worn by the user comprises a signal model defined by $$R(l,k) = S(l,k)\tilde{H}(k,\theta) + V(l,k)$$

where R(l, k) is a time-frequency representation of the noisy target signal, S(l, k) is a time-frequency representation of the noise-free target signal, $\tilde{H}(k, \theta)$ is a frequency transfer function of the acoustic propagation channel from the target sound source to the respective input transducers of the hearing device, and V(l, k) is a time-frequency representation of the additive noise.

9. A hearing device according to claim 1 wherein the signal processing unit is configured to provide a maximum-likelihood estimate of the direction of arrival $\theta$ of the target sound signal by finding the value of $\theta$, for which the likelihood function $$\tilde{L} = \sum_{k=1}^{N} \{-(Z(l,k))^H C_v^{-1}(Z(l,k))\}$$

is maximum, wherein Z(l, k)=R(l,k)−S(l,k)$\hat{H}$(k,$\theta$) is a is a time-frequency representation of an estimate of the additive noise, and $C_v(l, k)$ is the inter-input transducer noise covariance matrix.

10. A hearing device according to claim 1 wherein the at least one input transducer of the hearing devices comprises one or two input transducers.

11. A hearing device according to claim 1 configured to determine whether a signal arrives from a front or a rear half plane relative to a user.

12. A hearing device according to claim 1 comprising a hearing aid, a headset, an earphone, an ear protection device or a combination thereof.

13. A hearing device according to claim 1 configured to only determine a direction of arrival, when a voice is detected in an input signal.

14. A hearing device according to claim 1 comprising a beamformer unit and wherein the signal processing unit is configured to use the estimate of the direction of arrival of the target sound signal relative to the user in the beamformer unit to provide a beamformed signal comprising the target signal.

15. A hearing device according to claim 10, wherein the one or two input transducers are microphones.

16. A hearing device according to claim 13 configured to only determine a direction of arrival, when a voice is detected in the wirelessly received noise-free signal.

17. A hearing system according to claim 1 configured to determine a difference between the target source to input transducer propagation delays for the first and second hearing devices.

18. A hearing system according to claim 1, wherein the first and second hearing devices further comprise:
   one or more detectors for monitoring a current input signal of the hearing devices and/or the current acoustic environment, including one or more of a correlation detector, a level detector, and a speech detector.

19. A hearing system comprising first and second hearing devices according to claim 1 adapted to be located at or in first and second ears, or to be fully or partially implanted in the head at or in first and second ears, respectively, of the user.

20. A hearing system according to claim 19 configured to estimate a target source to input transducer propagation delay for the first and second hearing devices.

* * * * *